3,404,743
BALANCE DEVICE
Harold R. Schultz, 4001 Sherwood,
Orange, Calif. 92667
Filed July 29, 1966, Ser. No. 568,852
9 Claims. (Cl. 177—190)

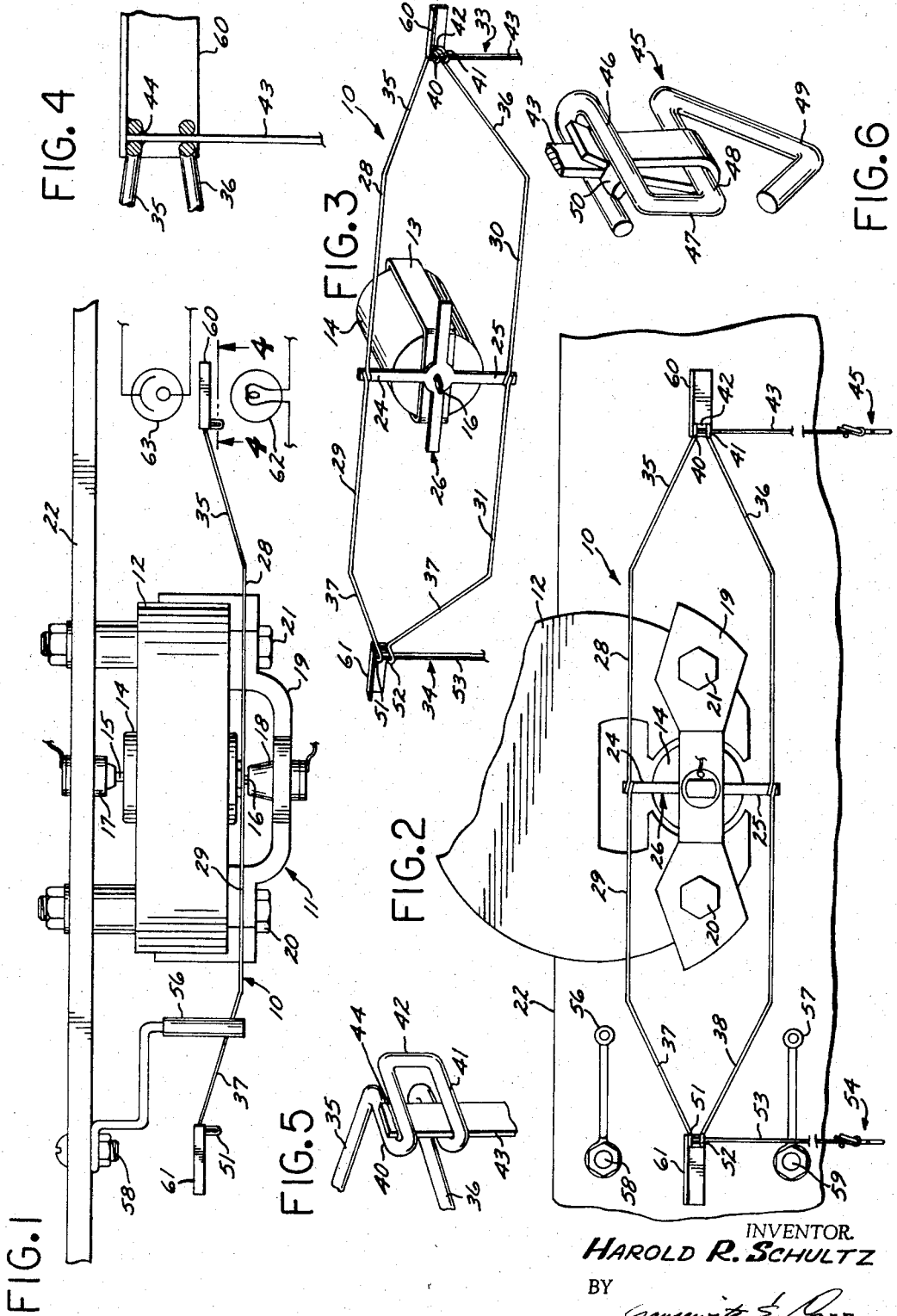
Oct. 8, 1968  H. R. SCHULTZ  3,404,743
BALANCE DEVICE
Filed July 29, 1966
INVENTOR.
HAROLD R. SCHULTZ
BY
ATTORNEYS

ABSTRACT OF THE DISCLOSURE

A balance including a beam pivotal about a fulcrum, the beam having double-over portions at its outer ends which receive flexible members providing the suspension means, the flexible members being secured by soldering, and the beam including guide portions for the flexible members adjacent their attachments.

---

This invention pertains to weight-measuring devices, and in particular to a precision balance incorporating an improved beam construction.

This invention is especially adapted for use in conjunction with an indicating or an automatic balancing system of high sensitivity.

For truly accurate measurement in a balance system, all possible sources of error must be taken into account. Features of conventional balance beams contribute to inaccuracies in results obtained. Most include loose joints between the pan loops and the beam that allow shifting of the connecting point with attendant measurement errors. Other beams have used depending wires for supporting the pans that receive the samples. As the beam is deflected about its fulcrum, a moment is imposed upon these support wires tending to bend them out of vertical alignment. This is because, as the pivoting of the beam takes place, the end from which the supporting wire is suspended no longer is horizontal, and the movement of the beam end as this occurs tends to twist or kink the wire that is associated with it. Even a slight kinking of the suspension wire will adversely affect the accuracy of the reading obtained. A mechanical clamping arrangement has been used for attaching the pan support wires to the beam, which leads to the deflection of the wires and detracts from the accuracy of the balance unit. The upper ends of the flexible suspension wires are wrapped partially around supports at the beam ends and then mechanically attached to the beam. This imposes bending loads on the support wires. The use of a mechanical means to hold the upper ends of the suspension members has been necessary because the beams normally are constructed of aluminum, and it is difficult to make a satisfactory soldered connection to that metal. As a result of the high thermal conductivity of aluminum, both ends of the balance will be at nearly the same temperature at the time the reading is taken, despite ambient temperature differences at the two ends of the beam. Therefore, ambient temperature differentials will not usually result in unequal beam lengths on the two sides of the fulcrum. For this reason, it has been considered desirable to use aluminum for balance beams despite the problems in securing the sample suspension members to the beam.

According to the present invention, an improved balance beam is provided in which the suspension members are attached to the beam in a way that avoids kinking or deviation from vertical alignment. It is possible through the construction of this invention to employ soldered connections between the suspension members and the beam, avoiding bending of the pan supports and the mechanical clamps of the prior art. The beam of this invention preferably is constructed of beryllium copper, which is a very easily soldered material and permits the connection of the suspension members without the use of mechanical clamps. Beryllium copper does not transmit heat as readily as aluminum, so that the ends of the beam will not stabilize at the same temperature as rapidly as is the case where a conventional aluminum beam is used. However, the coefficient of thermal expansion of beryllium copper is much less than that of aluminum, so that the effects of temperature differentials on the beam are not nearly as pronounced as for an aluminum beam. The net effect is that with the improved weight suspension arrangement of the applicant's invention, utilizing soldered attachments to the beryllium copper beam, distinctly better results are obtained than in prior designs with the aluminum beam and conventional connections for the pan support wires. The construction of this invention also provides a simplified adjusting arrangement permitting the beam arm lengths to be set much more readily than with the usual design.

The balance of this invention may be used with a band suspension D'Arsonval meter movement. Each beam arm includes an upper and a lower strut of beryllium copper wire, which converge at their outer ends. While normally made symmetrical, the beam can be constructed with a single arm on one side of the fulcrum and a counterweight on the other. The suspension member at the end of the beam includes a thin strip of flexible material that is received between upper and lower doubled-over portions formed at the convergence of the two struts of the beam arm. The strip is soldered at the upper doubled-over section that receives it and guided through the lower portion. At the bottom, the suspension strip connects to a hook element the upper portion of which is bent to a U shape, with the upper arm of the U being doubled over and the strip passing through it. The strip loops around the bottom portion of the U-arm and the soldered connection is made at the upper doubled-over portion of the U-shaped part of the hook. The result is an attachment that is readily made and a pan support which has virtually no tendency to kink or get out of vertical alignment as the beam is deflected.

Additionally, the beam ends incline laterally to facilitate adjustment of the lengths of the beam arms. To increase the effective length, the inclined beam end merely is bent back to be more nearly straight and aligned with with principal portion of the beam. This makes adjustment of the balance a very simple matter. In obtaining a reading from the balance, a flag also may be carried at the end of the beam to provide an obstruction between a lamp and a photoelectric cell, so that a signal may be produced to indicate deflection of the beam.

An object of this invention is to provide a precision weight-measuring device.

Another object of this invention is to provide a balance device of improved accuracy.

A further object of this invention is to provide an improved balance beam and sample suspension arrangement which avoids kinking of the snuspension elements so that they maintain a vertical alingment upon deflection of the beam.

An additional object of this invention is to provide a balance beam having a simplified adjustment arrangement to control the arm lengths.

A still further object of this invention is to provide a balance in which it is possible to utilize soldered joints for assembling the parts, including soldered connections for the suspension elements rather than requiring a mechanical clamping arrangement.

Yet another object of this invention is to provide a balance beam constructed of beryllium copper.

These and other objects will become apparent from the following detailed description taken in connection with the accompanying drawing in which:

FIGURE 1 is a top plan view of a balance incorporating the arrangement of this invention;

FIGURE 2 is a front elevational view of the balance of FIGURE 1;

FIGURE 3 is a perspective view of the beam removed from the other components of the balance;

FIGURE 4 is an enlarged sectional view taken along line 4—4 of FIGURE 1, showing the connection of the suspension member to the beam;

FIGURE 5 is an enlarged perspective view also illustrating the connection of the suspension member to the beam, with the flag removed from the beam for clarity; and FIGURE 6 is a perspective view of the bottom portion of the suspension assembly, illustrating the connection of the hook.

With reference to the drawing, the beam 10 of this invention is shown in FIGURES 1 and 2 as associated with a D'Arsonval meter movement 11. The latter unit includes a permanent magnet 12 providing the field for the coil 13 which circumscribes the soft iron shunt 14 at the gap in the field. This coil is suspended on bands 15 and 16 from bushings 17 and 18. This provides an axis of rotation for the coil which may pivot by twisting the bands 15 and 16. A frame 19 is attached by bolts 20 and 21 to a plate 22 to mount the D'Arsonval unit.

The beam 10 connects to the fulcrum through the vertical post formed by the upright elements 24 and 25 of the star 26 which is coupled to the forward end of the coil and suspended with the coil on the bands 15 and 16. Upper struts 28 and 29 extend outwardly in opposite directions from the upper element 24, while lower struts 30 and 31 similarly project from the lower member 25. These struts are all made of beryllium copper alloy wire. The inner ends of the struts 28 and 29 are soldered at their connection to the upper star member 24, while inner ends of the lower struts 30 and 31 likewise are soldered to the lower star element 25.

At their outer ends, the struts on either side of the fulcrum formed by the suspending bands 15 and 16 are convergent and hold the suspension elements 33 and 34 by which loads are applied to the beam when in use. Thus, the end portions 35 and 36 of the struts 28 and 30 are inclined at equal angles to the horizontal and approach each other at their outer ends. Also, as best seen in FIGURE 1, the sections 35 and 36 are bent laterally relative to the central strut portions 28 and 30. The end portions 37 and 38 of the struts 29 and 31 are identical to the end portions 35 and 36, also being convergent and inclined laterally.

The struts 28 and 30 are integral at their outer ends where there is an upper laterally extending horizontal doubled-over section 40 and a similar section 41 below and parallel to it (see FIGURES 4 and 5). A short vertical length 42 interconnects the doubled-over portions 40 and 41. The support 33 includes a thin strip of platinum nickel alloy 42 having an upper end which passes through the doubled-over portions 40 and 41. The strip 43 is connected to the upper portion 40 by means of a solder joint 44. Solder is not applied, however, at the lower portion 41. Soldering is readily effected between the strip 43 and the beam because the beam is made of a material, such as beryllium copper, that is particularly adapted for effecting such connections.

At the bottom end of the strip 43 of the suspension unit 33 is a hook 45, which also is of beryllium copper.

The upper part of the hook 45, best illustrated in FIGURE 6, includes a horizontal doubled-over section 46 connecting by a short vertical section 47 to a horizontal portion 48 beneath and parallel to the portion 46. Together, the sections 46, 47 and 48 are substantially U-shaped. The hook portion 49 from which an object may be suspended extends below the horizontal section 48. The lower portion of the strip 43 extends through the doubled-over portion 46 and is looped around the horizontal part 48. The end of the loop also is passed through the doubled-over portion 46, and the strip 43 is soldered to the hook assembly at that location. This forms a solder joint 50 at the hook. Solder is not applied at the loop portion of the strip 43 that extends around the section 48 of the hook unit.

The opposite end of the beam 10 is of the same construction with regard to the arrangement of the supporting element 34. The integral beam components 29 and 31 include upper and lower doubled-over end portions 51 and 52 the former of which is soldered to the thin strip 53 of the suspension unit 34. The bottom end of the strip 53 connects to the hook element 54 in a manner similar to the connection of the strip 43 to the hook 45.

Deflection of the beam 10 is limited by stops 56 and 57 above and below the beam end portions 37 and 38, these being made up of relatively heavy wires with porous ceramic sleeves and mounted by bolts 58 and 59 to the support plate 22. Normally, the beam movement will be considerably less than that which would bring the beam ends into contact with the stops 56 and 57.

Carried by one end of the beam 10 are flags 60 and 61, which are for the purpose of providing an indication of the amount of deflection of the beam when the balance is in service. These are small strips of aluminum foil, L-shaped in cross section, attached to the end of the beam. As schematically illustrated in FIGURE 1, the flag 60 is interposed between a lamp 62 and a photoelectric cell 63. The other flag 61 then acts merely as a counterweight to balance the mass of the flag 60. The position of the flag 60 determines the amount of light which is incident on the photoelectric cell 63 which, in turn through appropriate circuitry, will give an indication of the rotational position of the balance beam 10. The beam of this invention may be incorporated in an indicating-type balance or, alternatively, in an automatic balance incorporating a servo system. An example of a circuit that can be utilized with the latter type of balance is found in the publication "Vacuum Microbalance Techniques," with particular reference to FIGURE 1 on page 30. This volume was published by Plenum Press, New York, 1963.

In setting the balance beam of this invention to make it ready for service, it is necessary to make certain that the beam ends on either side of the fulcrum are equally balanced so that the beam will remain static in a horizontal position when no weight is associated with it. This adjustment of the beam is very simply effected by virtue of the lateral angularity given to the beam end portions 35 and 36 on one side of the falcrum and 37 and 38 on the other side of the fulcrum. In order to increase the influence of one end of the beam, the end portion merely is straightened slightly, which swings the end through an arc and adds to its effective length. For example, if it is needed to make the beam heavier on the right-hand side of the fulcrum as the device is illustrated, the beam end portions 35 and 36 are bent slightly in the lateral direction to approach the plane of the principal strut portions 28 and 30. This slight straightening of the beam end is easily effected by gripping the beam with the jaws of pliers at the location where the outer strut portions 35 and 36 meet the principal inner strut portions 28 and 30. Merely by squeezing the pliers, a straightening effect and an increase in beam length are achieved. It is particularly simple, therefore, through the use of this invention to obtain precise balance of the beam.

The connection of the support units 33 and 34 to the beam ends enhances the accuracy of measurement through the beam of this invention. This connection causes the support units to maintain their vertical positions without any tendency to kink or deviate from a vertical attitude as the beam 10 pivots about the fulcrum. The vertical strips 43 and 53 of the suspension units are held in vertical alignment at their attachments to the beam ends without being curved to engage a slot or otherwise to be clamped as in a conventional design. The beam wires hold the strips 43 and 53 with their width dimensions substantially parallel to the axis of rotation of the beam. As a result, when the beam deflects about the fulcrum, the strips bend quite readily about the curved contours of the sets of adjacent parallel wires formed by the lower doubled-over portions 41 and 52 at the beam ends. The bending does not take place at a rigid joint, such as at the upper doubled-over sections where the soldered connection is made. Thus, the lower doubled-over portions 41 and 52 help guide the vertical strips 43 and 53, but do not interfere with the free flexing of the strips as the beam movement takes place. Accuracy of measurement is refined to a considerable degree in this manner.

Also, the hooks 45 and 54 are suspended immediately beneath the beam ends and connected to the strips 43 and 53 in such a manner that weights on the hooks do not tend to impose torques on the strips which could cause bending of them. The bottom looped portions of the strips are directly above the convergent portion of the hook section where the load is attached, and the strips extend directly above this point to the beam ends. Again, therefore, the design causes the support assembly to maintain its vertical position as the balance is in use so that true readings can be obtained.

The foregoing detailed description is to be clearly understood as given by way of illustration and example only, the spirit and scope of this invention being limited solely by the appended claims.

I claim:
1. A balance device comprising
 a fulcrum means defining an axis of rotation,
 a beam pivotal about said axis of rotation,
  said beam including an arm extending outwardly from said fulcrum means,
   said arm including a pair of substantially parallel adjacent members
    outwardly of said fulcrum means and substantially parallel to said axis of rotation,
 a weight-supporting means,
  said weight-supporting means including a flexible member interposed between said substantially parallel adjacent members and depending therefrom,
   said flexible member having a portion extending above said substantially parallel adjacent members,
 and means connecting said portion of said flexible member to said arm.
2. A device as recited in claim 1 in which said arm is made of beryllium copper,
 and in which said means conecting said portion of said flexible member to said arm includes a solder joint.
3. A balance device comprising
 a fulcrum means,
 a beam pivotal about said fulcrum means,
  said beam including a strut extending from said fulcrum means to the outer end portion of said beam,
 suspension means at said outer end portion for attaching an object to said beam,
  said strut at said outer end portion having upper and lower doubled-over portions,
  said suspension means including a flexible member extending vertically through said doubled-over portions,
 and means securing said flexible member to said upper doubled-over portion.
4. A device as recited in claim 3 in which
 said strut is of a solderable material,
 and said means for securing said flexible member to said upper doubled-over portion includes a solder joint.
5. A balance device comprising
 a fulcrum means,
 a beam means pivotal about said fulcrum means, and suspension means for securing objects to said beam means,
  said beam means on either side of said fulcrum means including upper and lower struts,
   said struts meeting at the outer end of said beam means and defining upper and lower laterally extending horizontal doubled-over portions,
  each suspension means including a vertically extending flexible member extending through said doubled-over portions,
  said upper doubled-over portion being connected to said flexible element by means of solder.
6. A device as recited in claim 5 in which
 said beam means inwardly of said outer end is inclined laterally with respect to portions of said beam means inwardly thereof,
  whereby the effective length of said beam means relative to said fulcrum means is adjustable by bending said portion of said beam means to approach the plane of the beam means inwardly of said portion.
7. A balance device comprising
 a fulcrum means defining an axis of rotation,
 a balance beam,
  said beam including a post extending above and below said axis,
   said post being connected to said fulcrum means and pivotal about said axis,
  a pair of strut means,
   said strut means extending outwardly on opposite sides of said post, each of said strut means including a duality of elongated members one of which is connected to said post above said axis and the other of which is connected to said post below said axis,
    said elongated members being convergent at their outer ends, each of said elongated members having a doubled-over portion providing adjacent parallel members extending laterally at said outer end thereof in a direction substantially parallel to said axis, said doubled-over portions being located one above the other,
 and a support means connected to each of said strut means,
  each of said support means including a flexible member extending vertically between the adjacent parallel members of each of said end portions of the strut means to which said support means is connected,
  a solder joint connecting said flexible member to the upper one of said doubled-over end portions,
  and a hook means carried by each of said flexible members.
8. A device as recited in claim 7 in which said hook means includes
 a pair of adjacent parallel elements,
 an additional member beneath said pair of parallel elements,
 and weight-engaging means beneath said additional member, the lower end of said flexible member defining a loop extending downwardly from between said parallel elements, around said additional member and upwardly to extend between said parallel elements,
and a solder joint connecting said flexible members to said parallel elements.

9. A device as recited in claim 7 in which
said strut means are beryllium copper alloy wire having a circular cross section,
and said flexible member is a flat strip the width dimension of which is substantially parallel to said axis.

References Cited
UNITED STATES PATENTS

| 764,377 | 7/1904 | Richter | 177—190 X |
| 1,625,866 | 4/1927 | Pawling. | |
| 2,652,885 | 9/1953 | Engel | 287—189.35 X |

RICHARD B. WILKINSON, *Primary Examiner.*

GEORGE H. MILLER, JR., *Assistant Examiner.*